(12) United States Patent
Kitawaki et al.

(10) Patent No.: US 11,721,361 B2
(45) Date of Patent: Aug. 8, 2023

(54) ALUMINUM ALLOY SUBSTRATE FOR MAGNETIC DISKS, METHOD FOR PRODUCING SAME, AND MAGNETIC DISK USING SAID ALUMINUM ALLOY SUBSTRATE FOR MAGNETIC DISKS

(71) Applicants: UACJ CORPORATION, Tokyo (JP); FURUKAWA ELECTRIC CO., LTD., Tokyo (JP)

(72) Inventors: Kotaro Kitawaki, Tokyo (JP); Takuya Murata, Tokyo (JP); Makoto Yonemitsu, Tokyo (JP); Yu Matsui, Tokyo (JP); Yasuo Fujii, Tokyo (JP); Ryo Sakamoto, Tokyo (JP); Takashi Nakayama, Tokyo (JP); Wataru Kumagai, Tokyo (JP)

(73) Assignees: UACJ CORPORATION, Tokyo (JP); FURUKAWA ELECTRIC CO., LTD., Tokyo (JP)

( * ) Notice: Subject to any disclaimer, the term of this patent is extended or adjusted under 35 U.S.C. 154(b) by 768 days.

(21) Appl. No.: 16/611,770

(22) PCT Filed: Apr. 9, 2018

(86) PCT No.: PCT/JP2018/014894
§ 371 (c)(1),
(2) Date: Nov. 7, 2019

(87) PCT Pub. No.: WO2018/207523
PCT Pub. Date: Nov. 15, 2018

(65) Prior Publication Data
US 2021/0151077 A1  May 20, 2021

(30) Foreign Application Priority Data

May 12, 2017  (JP) .................................. 2017-095115

(51) Int. Cl.
*G11B 5/73* (2006.01)
*C22C 21/06* (2006.01)
(Continued)

(52) U.S. Cl.
CPC .......... *G11B 5/73913* (2019.05); *C22C 21/06* (2013.01); *C22C 21/10* (2013.01);
(Continued)

(58) Field of Classification Search
CPC . G11B 5/73913; G11B 5/73919; C22C 21/06; C22C 21/10; C22C 21/12;
(Continued)

(56) References Cited

U.S. PATENT DOCUMENTS

2017/0327930 A1* 11/2017 Kitawaki ................ C22C 21/02

FOREIGN PATENT DOCUMENTS

JP    02305936 A    12/1990
JP    2002313061 A  10/2002
(Continued)

OTHER PUBLICATIONS

ISR of Int'l. application No. PCT/JP2018/0149894, dated Jun. 26, 2018.

*Primary Examiner* — Anthony M Liang
*Assistant Examiner* — Danny N Kang
(74) *Attorney, Agent, or Firm* — Greer, Burns & Crain, Ltd.

(57) ABSTRACT

There are provided: an aluminum alloy substrate for a magnetic disk, the aluminum alloy substrate including an aluminum alloy including 0.4 to 3.0 mass % of Fe and the balance of Al and unavoidable impurities, in which second phase particles having a longest diameter of 0.5 μm or more and less than 2.0 μm are dispersed at a distribution density of 5000 particles/mm² or more; a method for producing the (Continued)

same; and a magnetic disk using the aluminum alloy substrate for a magnetic disk.

14 Claims, 1 Drawing Sheet

(51) Int. Cl.
*C22C 21/12* (2006.01)
*C22F 1/047* (2006.01)
*C22C 21/10* (2006.01)
*C22F 1/053* (2006.01)
*C22F 1/057* (2006.01)

(52) U.S. Cl.
CPC .............. *C22C 21/12* (2013.01); *C22F 1/047* (2013.01); *C22F 1/053* (2013.01); *C22F 1/057* (2013.01); *G11B 5/73919* (2019.05)

(58) Field of Classification Search
CPC .......... C22C 21/00; C22F 1/047; C22F 1/053; C22F 1/057; C22F 1/00; C22F 1/04
See application file for complete search history.

(56) References Cited

FOREIGN PATENT DOCUMENTS

| | | |
|---|---|---|
| JP | 2006241513 A | 9/2006 |
| JP | 2017031507 A | 2/2017 |
| WO | 2016068293 A1 | 5/2016 |

* cited by examiner

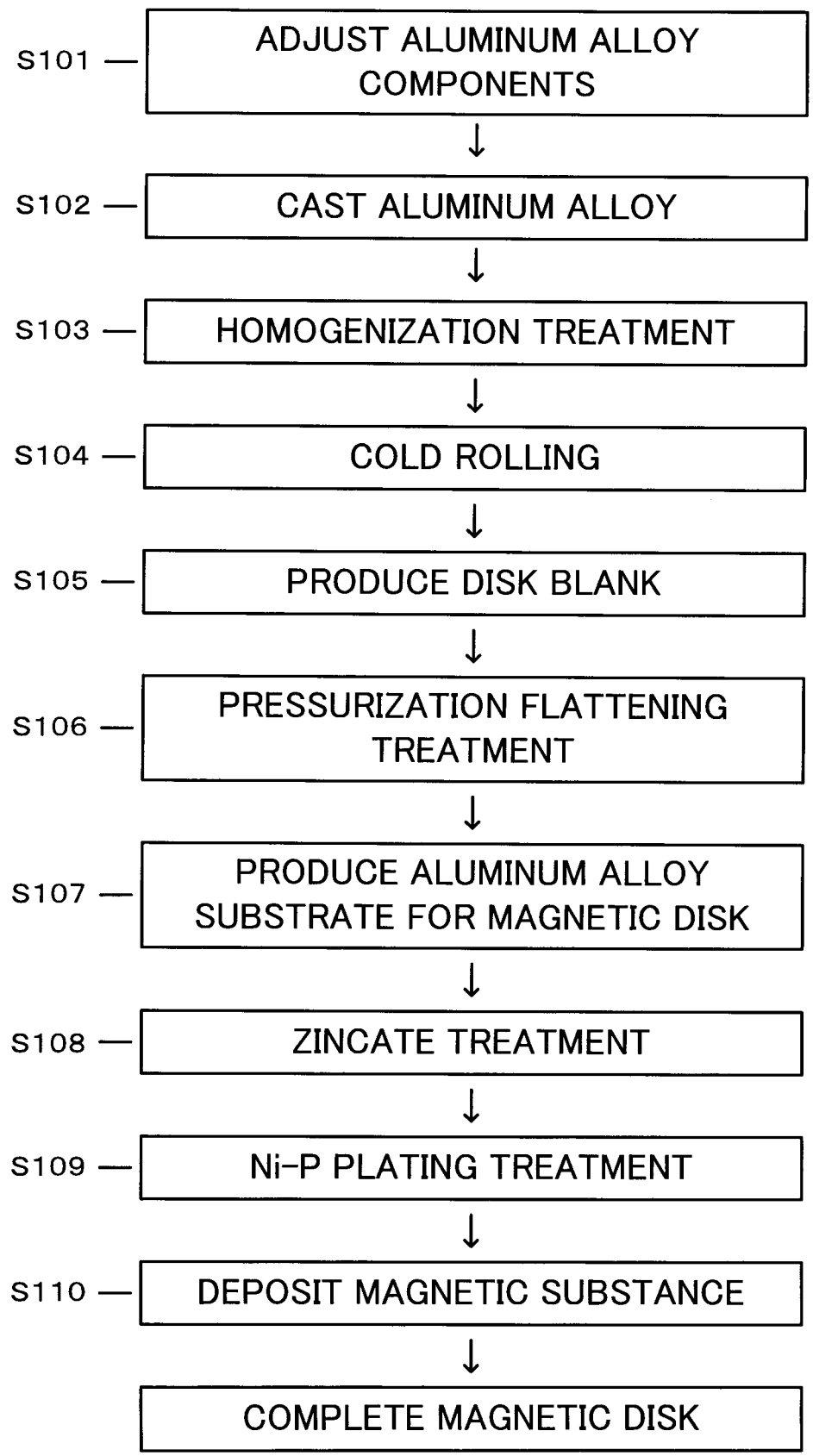

ALUMINUM ALLOY SUBSTRATE FOR MAGNETIC DISKS, METHOD FOR PRODUCING SAME, AND MAGNETIC DISK USING SAID ALUMINUM ALLOY SUBSTRATE FOR MAGNETIC DISKS

This is a National Phase Application filed under 35 U.S.C. § 371, of International Application No. PCT/JP2018/014894, filed Apr. 9, 2018, the contents of which are incorporated by reference.

TECHNICAL FIELD

The present disclosure relates to: an aluminum alloy substrate for a magnetic disk, having a high strength and a favorable fluttering characteristic; a method for producing the same; and a magnetic disk using the aluminum alloy substrate for a magnetic disk.

BACKGROUND ART

Magnetic disks used in storage devices for computers are produced using substrates that have favorable plating properties and are excellent in mechanical characteristics and workability. For example, such a magnetic disk is produced with: a substrate based on an aluminum alloy according to JIS 5086 (including 3.5 to 4.5 mass % of Mg, 0.50 mass % or less of Fe, 0.40 mass % or less of Si, 0.20 to 0.70 mass % of Mn, 0.05 to 0.25 mass % of Cr, 0.10 mass % or less of Cu, 0.15 mass % or less of Ti, and 0.25 mass % or less of Zn with the balance of Al and unavoidable impurities); and the like.

Common magnetic disks are produced by first producing an annular aluminum alloy substrate, plating the aluminum alloy substrate, and then depositing a magnetic substance on a surface of the aluminum alloy substrate.

For example, a magnetic disk made of an aluminum alloy according to the JIS 5086 alloy is produced by the following production steps. First, an aluminum alloy material allowed to contain predetermined chemical components is cast to obtain an ingot, and the ingot is subjected to hot rolling and then to cold rolling to produce a rolled material having a thickness required for the magnetic disk. It is preferable to anneal the rolled material during the cold rolling and/or the like as needed. Then, the rolled material is stamped to have an annular shape. In order to eliminate distortion and/or the like occurring in the production steps, an aluminum alloy sheet allowed to have an annular shape is layered thereon, and the resultant is subjected to pressurization annealing in which the resultant is flattened by annealing the resultant while pressurizing both surfaces in both ends of the resultant. Thus, an annular aluminum alloy substrate is produced.

The annular aluminum alloy substrate produced in such a manner is subjected to cutting work, grinding work, degreasing, etching, and zincate treatment (Zn substitution treatment) as pretreatment and then to electroless plating with Ni—P which is a rigid non-magnetic metal as undercoat treatment. The plated surface is subjected to polishing, followed by sputtering a magnetic substance on the Ni—P electroless-plated surface, to produce the magnetic disk made of an aluminum alloy.

In recent years, larger-capacity, higher-density, and, in addition, higher-speed magnetic disks have been demanded due to the needs of multimedia and the like. The higher capacity has resulted in an increase in the number of magnetic disks placed in a storage device. Thus, thinned magnetic disks have also been demanded. However, the thinning of an aluminum alloy substrate for a magnetic disk results in decreased strength. Therefore, the higher strength of aluminum alloy substrates has been demanded.

In addition, thinning and enhanced speed result in an increase in exciting force caused by an increase in fluid force due to decreased rigidity and high-speed rotation, thereby causing disk flutter to be more likely to occur. This is because high-speed rotation of magnetic disks causes unstable airflow to be generated between the disks, and the airflow results in vibration (fluttering) of the magnetic disks. Such a phenomenon is considered to occur because the low rigidity of a substrate results in the increased vibration of the magnetic disks, and a head is incapable of following such a variation. The occurrence of fluttering results in an increase in the positioning error of a head which is a reader. Therefore, reduction in disk flutter has been earnestly demanded.

In addition, the higher density of a magnetic disk results in a minuter magnetic region per bit. Such a minuter magnetic region causes a reading error to be more likely to occur due to the deviation of the positioning error of the head. Thus, a reduction in disk flutter which is the principal factor of the positioning error of the head has been earnestly demanded.

In light of such actual circumstances, aluminum alloy substrates for magnetic disks with high strength and reduced disk flutter have been earnestly desired and examined in recent years. For example, it has been proposed that an airflow suppression component including a plate facing a disk is implemented in a hard disk drive. Patent Literature 1 proposes a magnetic disk apparatus in which an air spoiler is placed upstream of an actuator. The air spoiler weakens air flow toward the actuator on the magnetic disk to reduce the windage vibration of a magnetic head. In addition, the air spoiler weakens airflow on the magnetic disk, thereby suppressing disk flutter. In addition, Patent Literature 2 proposes a method in which a large amount of Mg contributing to improvement in the strength of an aluminum alloy sheet is allowed to be contained to improve the strength.

In the method disclosed in Patent Literature 1, however, a fluttering suppression effect is varied according to a variation in the spacing between the placed air spoiler and a substrate for a magnetic disk, the high precision of components is required, and therefore, an increase in component cost is caused.

The method in which a large amount of Mg is allowed to be contained, described in Patent Literature 2, is effective for improving strength. In the method, however, disk flutter is likely to occur, and it has been impossible to obtain a target characteristic of providing low disk flutter under present circumstances.

CITATION LIST

Patent Literature

Patent Literature 1: Unexamined Japanese Patent Application Kokai Publication No. 2002-313061

Patent Literature 2: Unexamined Japanese Patent Application Kokai Publication No. 2006-241513

SUMMARY OF INVENTION

Technical Problem

The present disclosure was made under such actual circumstances with an objective to provide an aluminum alloy substrate for a magnetic disk, having a high strength and an excellent disk fluttering characteristic, a method for producing the same, and a magnetic disk using the aluminum alloy substrate for a magnetic disk.

Solution to Problem

In other words, claim 1 of the present disclosure describes an aluminum alloy substrate for a magnetic disk, the aluminum alloy substrate including an aluminum alloy including 0.4 to 3.0 mass % of Fe and a balance of Al and unavoidable impurities, wherein second phase particles having a longest diameter of 0.5 μm or more and less than 2.0 μm are dispersed at a distribution density of 5000 particles/mm$^2$ or more.

Claim 2 of the present disclosure describes that the aluminum alloy further includes one or more selected from the group consisting of 0.1 to 3.0 mass % of Mn, 0.1 to 0.4 mass % of Si, 0.1 to 3.0 mass % of Ni, 0.005 to 1.000 mass % of Cu, 0.1 to 6.0 mass % of Mg, 0.01 to 1.00 mass % of Cr, and 0.01 to 1.00 mass % of Zr, in accordance with claim 1.

Claim 3 of the present disclosure describes that the aluminum alloy further includes 0.005 to 1.000 mass % of Zn, in accordance with claim 1 or 2.

Claim 4 of the present disclosure describes that the aluminum alloy further includes one or more selected from the group consisting of Ti, B, and V in a total content of 0.005 to 0.500 mass %, in accordance with any one of claims 1 to 3.

Claim 5 of the present disclosure describes that a cross section has an average crystal particle diameter of 70 μm or less in a sheet thickness direction, in accordance with any one of claims 1 to 4.

Claim 6 of the present disclosure describes that proof stress is 60 MPa or more after heating at 340° C. for 3 hours in atmospheric air, in accordance with any one of claims 1 to 5.

Claim 7 of the present disclosure describes a magnetic disk wherein an electroless Ni—P plating treatment layer and a magnetic layer thereon are disposed on a surface of the aluminum alloy substrate for a magnetic disk according to any one of claims 1 to 6.

Claim 8 of the present disclosure describes a method for producing the aluminum alloy substrate for a magnetic disk according to any one of claims 1 to 6, the method including: a continuous casting step of continuously casting a cast sheet by using the aluminum alloy; a cold-rolling step of cold-rolling the cast sheet; a disk blank stamping step of stamping the cold-rolled sheet to have an annular shape; a pressurization annealing step of subjecting a stamped disk blank to pressurization annealing; and a cutting and grinding step of subjecting the blank subjected to the pressurization annealing, to cutting work and grinding work, wherein a temperature of the cast sheet after a lapse of one minute after the continuous casting step is set at 230 to 350° C., and a temperature of the cast sheet after a lapse of ten minutes after the continuous casting step is set at 150° C. or more and less than 230° C.

Claim 9 of the present disclosure describes a method for producing the aluminum alloy substrate for a magnetic disk according to any one of claims 1 to 6, the method including: a continuous casting step of continuously casting a cast sheet by using the aluminum alloy; a homogenization treatment step of subjecting the cast sheet to homogenization treatment; a cold-rolling step of cold-rolling the cast sheet subjected to the homogenization treatment; a disk blank stamping step of stamping the cold-rolled sheet to have an annular shape; a pressurization annealing step of subjecting the stamped disk blank to pressurization annealing; and a cutting and grinding step of subjecting the blank subjected to the pressurization annealing, to cutting work and grinding work, wherein a temperature of the cast sheet after a lapse of one minute after the continuous casting step is set at 230 to 350° C., a temperature of the cast sheet after a lapse of ten minutes after the continuous casting step is set at 150° C. or more and less than 230° C., and the cast sheet is heat-treated at 300 to 450° C. for 0.5 to 24 hours in the homogenization treatment step.

Claim 10 of the present disclosure describes that an annealing treatment step of annealing the cast sheet or the rolled sheet before or in the cold-rolling step is further included, in accordance with claim 8 or 9.

Advantageous Effects of Invention

According to the present disclosure, there can be provided an aluminum alloy substrate for a magnetic disk, having a high strength and an excellent disk fluttering characteristic, a method for producing the same, and a magnetic disk using the aluminum alloy substrate for a magnetic disk.

BRIEF DESCRIPTION OF DRAWINGS

FIG. 1 is a flow diagram illustrating a method for producing an aluminum alloy substrate for a magnetic disk and a magnetic disk according to the present disclosure.

DESCRIPTION OF EMBODIMENTS

The present inventors focused on the relationships between the strength and fluttering characteristic of a substrate and the material of the substrate and intensively researched the relationships between such characteristics and the characteristics of the substrate (magnetic disk material). As a result, the content of Fe and the distribution of second phase particles were found to greatly influence the strength. In addition, second phase particles and the content of Fe in an aluminum alloy substrate were found to greatly influence the fluttering characteristic of a magnetic disk, measured in air or helium. Thus, as a result of examining an Fe content and second phase particles having a longest diameter of 0.5 μm or more and less than 2.0 μm in a metal structure, the present inventors found that an aluminum alloy substrate for a magnetic disk, in which among the second phase particles having a longest diameter of 0.5 μm or more and less than 2.0 μm, second phase particles particularly having an Fe amount of 0.4 to 3.0 mass % (hereinafter, simply abbreviated as "%") are dispersed at a distribution density of 5000 particles/mm$^2$ or more, is improved in strength and fluttering characteristic. The present disclosure was thus accomplished.

A. Aluminum Alloy Substrate for Magnetic Disk According to Present Disclosure

The aluminum alloy substrate for a magnetic disk according to the present disclosure (hereinafter, abbreviated as "aluminum alloy substrate according to the present disclosure" or simply as "aluminum alloy substrate") will be described in detail below.

1. Alloy Composition

Aluminum alloy components included in the aluminum alloy substrate for a magnetic disk using an Al—Fe-based alloy according to the present disclosure, as well as the content thereof will be described below.

Fe:

Fe is an essential element, exists principally as second phase particles (Al—Fe-based intermetallic compound or the like), exists to be partly solid-dissolved in a matrix, and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. It is impossible to obtain a sufficient strength and a sufficient fluttering characteristic when the content of Fe in an aluminum alloy is less than 0.4%. In contrast, an Fe content of more than 3.0% results in generation of a large number of coarse Al—Fe-based intermetallic compound particles. Such coarse Al—Fe-based intermetallic compound particles fall off, thereby generating large recesses, in etching, zincate treatment, cutting work, and grinding work, and the deterioration of the smoothness of a plated surface and the peeling of plating occur. In addition, workability is also deteriorated in a rolling step. Therefore, the content of Fe in the aluminum alloy is set in a range of 0.4 to 3.0%. The content of Fe is preferably in a range of 0.6 to 2.0% and more preferably in a range of 0.8 to 1.8%.

One or more selected from the group consisting of 0.1 to 3.0% of Mn, 0.1 to 0.4% of Si, 0.1 to 3.0% of Ni, 0.005 to 1.000% of Cu, 0.1 to 6.0% of Mg, 0.01 to 1.00% of Cr, and 0.01 to 1.00% of Zr may be further contained as first selective elements in order to further improve the strength and fluttering characteristic of the aluminum alloy substrate for a magnetic disk. In addition, 0.005 to 1.000% of Zn may be further contained as a second selective element. Furthermore, one or more selected from the group consisting of Ti, B, and V in a total content of 0.005 to 0.500% may be further contained as third selective elements. The selective elements will be described below.

Mn:

Mn exists principally as second phase particles (Al—Mn-based intermetallic compound or the like) and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. The effect of improving the strength and fluttering characteristic of the aluminum alloy substrate can be further enhanced by allowing the content of Mn in the aluminum alloy to be 0.1% or more. In addition, generation of a large number of coarse Al—Mn-based intermetallic compound particles is inhibited by allowing the content of Mn in the aluminum alloy to be 3.0% or less. Such coarse Al—Mn-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Mn in the aluminum alloy is preferably set in a range of 0.1 to 3.0%, and more preferably set in a range of 0.1 to 1.0%.

Si:

Si exists principally as second phase particles (Si particles or the like) and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. The effect of improving the strength and fluttering characteristic of the aluminum alloy substrate can be further enhanced by allowing the content of Si in the aluminum alloy to be 0.1% or more. In addition, generation of a large number of coarse Si particles is inhibited by allowing the content of Si in the aluminum alloy to be 0.4% or less. Such coarse Si particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Si in the aluminum alloy is preferably set in a range of 0.1 to 0.4%, and more preferably set in a range of 0.1 to 0.3%.

Ni:

Ni exists principally as second phase particles (Al—Ni-based intermetallic compound or the like) and exhibits the effect of improving the strength and fluttering characteristic of the aluminum alloy substrate. Application of vibrations to such a material results in immediate absorption of vibrational energy due to viscous flow in the interface between the second phase particles and the matrix to obtain a very favorable fluttering characteristic. The effect of improving the strength and fluttering characteristic of the aluminum alloy substrate can be further enhanced by allowing the content of Ni in the aluminum alloy to be 0.1% or more. In addition, generation of a large number of coarse Al—Ni-based intermetallic compound particles is inhibited by allowing the content of Ni in the aluminum alloy to be 3.0% or less. Such coarse Al—Ni-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Ni in the aluminum alloy is preferably set in a range of 0.1 to 3.0%, and more preferably set in a range of 0.1 to 1.0%.

Cu:

Cu exists principally as second phase particles (Al—Cu-based intermetallic compound or the like) and exhibits the effect of improving the strength and fluttering characteristic of the aluminum alloy substrate. In addition, the amount of Al melted in zincate treatment is decreased. Furthermore, the effect of uniformly, thinly, and minutely depositing a zincate coating film to improve smoothness in a subsequent plating step is exhibited. The effect of improving the strength and fluttering characteristic of the aluminum alloy substrate and the effect of improving smoothness can be further enhanced by allowing the content of Cu in the aluminum alloy to be 0.005% or more. In addition, generation of a large number of coarse Al—Cu-based intermetallic compound particles is inhibited by allowing the content of Cu in the aluminum alloy to be 1.000% or less. Such coarse Al—Cu-based intermetallic compound particles can be inhibited from falling off, thereby generating large recesses, in etching, zincate treatment, cutting work, and grinding work, to further enhance the effect of improving the smoothness of the plated surface, and the peeling of the plating can be further inhibited from occurring. In addition, the deterioration of the workability in the rolling step can be further inhibited. Therefore, the content of Cu in the aluminum alloy is preferably set in a range of 0.005 to 1.000%, and more preferably set in a range of 0.005 to 0.400%.

Mg:

Mg exists principally as second phase particles (Mg—Si-based intermetallic compound or the like) and exhibits the effect of improving the strength and fluttering characteristic of the aluminum alloy substrate. The effect of improving the strength and fluttering characteristic of the aluminum alloy substrate can be further enhanced by allowing the content of Mg in the aluminum alloy to be 0.1% or more. In addition, generation of a large number of coarse Mg—Si-based intermetallic compound particles is inhibited by allowing the content of Mg in the aluminum alloy to be 6.0% or less. Such coarse Mg—Si-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Mg in the aluminum alloy is preferably set in a range of 0.1 to 6.0%, and more preferably set in a range of 0.3% or more and less than 1.0%.

Cr:

Cr exists principally as second phase particles (Al—Cr-based intermetallic compound or the like) and exhibits the effect of improving the strength and fluttering characteristic of the aluminum alloy substrate. The effect of improving the strength and fluttering characteristic of the aluminum alloy substrate can be further enhanced by allowing the content of Cr in the aluminum alloy to be 0.01% or more. In addition, generation of a large number of coarse Al—Cr-based intermetallic compound particles is inhibited by allowing the content of Cr in the aluminum alloy to be 1.00% or less. Such coarse Al—Cr-based intermetallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Cr in the aluminum alloy is preferably set in a range of 0.01 to 1.00%, and more preferably set in a range of 0.10 to 0.50%.

Zr:

Zr exists principally as second phase particles (Al—Zr-based intermetallic compound or the like) and exhibits the effect of improving the strength and fluttering characteristic of the aluminum alloy substrate. The effect of improving the strength and fluttering characteristic of the aluminum alloy substrate can be further enhanced by allowing the content of Zr in the aluminum alloy to be 0.01% or more. In addition, generation of a large number of coarse Al—Zr-based intermetallic compound particles is inhibited by allowing the content of Zr in the aluminum alloy to be 1.00% or less. Such coarse Al—Zr-based inter-metallic compound particles can be inhibited from falling off, thereby generating large recesses, in etching, zincate treatment, cutting work, and grinding work, and the deterioration of the smoothness of the plated surface and the peeling of the plating can be further inhibited from occurring. In addition, the deterioration of the workability in the rolling step can be further inhibited. Therefore, the content of Zr in the aluminum alloy is preferably set in a range of 0.01 to 1.00%, and more preferably set in a range of 0.10 to 0.50%.

Zn:

Zn exhibits the effects of decreasing the amount of Al melted in zincate treatment and of uniformly, thinly, and minutely depositing a zincate coating film to improve smoothness and adhesiveness in the subsequent plating step. In addition, Zn forms second phase particles together with other added elements and exhibits the effect of improving the fluttering characteristic. The effects of decreasing the amount of Al melted in the zincate treatment and of uniformly, thinly, and minutely depositing the zincate coating film to improve the smoothness of the plating can be further enhanced by allowing the content of Zn in the aluminum alloy to be 0.005% or more. By allowing the content of Zn in the aluminum alloy to be 1.000% or less, the zincate coating film becomes uniform to enable the smoothness of the plated surface to be further inhibited from deteriorating, and the plating can also be further inhibited from peeling. Furthermore, the deterioration of the workability in the rolling step can be further inhibited. Therefore, the content of Zn in the aluminum alloy is preferably set in a range of 0.005 to 1.000%, and more preferably set in a range of 0.100 to 0.700%.

Ti, B, V:

Ti, B, and V form second phase particles (such as borides such as $TiB_2$, and $Al_3Ti$ and Ti-V-B particles), which become crystal grain nuclei, in a solidification process in casting, and therefore enable crystal grains to be finer. As the result, plating properties are improved. In addition, the effect of reducing nonuniformity in the sizes of the second phase particles to reduce unevenness in strength and fluttering characteristic in the aluminum alloy substrate is exhibited by allowing the crystal grains to be finer. However, it is impossible to obtain the above-described effects when the total of the contents of Ti, B, and V is less than 0.005%. In contrast, even when the total of the contents of Ti, B, and V is more than 0.500%, the effects are saturated, and it is impossible to obtain further noticeable improvement effects. Therefore, the total of the contents of Ti, B, and V in the case of adding Ti, B, and V is preferably set in a range of 0.005 to 0.500%, and more preferably set in a range of 0.005 to 0.100%. When only any one of Ti, B, and V is contained, the total refers to the content of the one; when any two thereof are contained, the total refers to the total of the two; and when all the three thereof are contained, the total refers to the total of the three.

Other Elements:

In addition, the balance of the aluminum alloy used in the present disclosure consists of Al and unavoidable impurities. In such a case, examples of the unavoidable impurities include Ga and Sn, and the characteristics of the aluminum alloy substrate obtained in the present disclosure are not deteriorated when each and the total of the unavoidable impurities are less than 0.1% and less than 0.2%, respectively.

2. Distribution State of Second Phase Particles

The distribution state of the second phase particles in the aluminum alloy substrate for a magnetic disk according to the present disclosure will now be described.

In the metal structure of the aluminum alloy substrate according to the present disclosure, the second phase particles having a longest diameter of 0.5 μm or more and less than 2.0 μm are dispersed at a distribution density of 5000 particles/mm² or more.

In such a case, the second phase particles mean precipitates or crystallized products, and specifically refer to, for example, particles such as Al—Fe-based intermetallic compounds ($Al_3Fe$, $Al_6Fe$, $Al_6(Fe, Mn)$, Al—Fe—Si, Al—Fe—

Mn—Si, Al—Fe—Ni, and Al—Cu—Fe, and the like), Al—Mn-based intermetallic compounds ($Al_6Mn$ and Al—Mn—Si), Si particles, Al—Ni-based intermetallic compounds ($Al_3Ni$ and the like), Al—Cu-based intermetallic compounds ($Al_2Cu$ and the like), Mg—Si-based intermetallic compounds ($Mg_2Si$ and the like), Al—Cr-based intermetallic compounds ($Al_7Cr$ and the like), and Al—Zr-based intermetallic compounds ($Al_3Zr$ and the like).

In the metal structure of the aluminum alloy substrate according to the present disclosure, the effect of maintaining the aluminum alloy substrate to have a high strength is exhibited when the second phase particles having a longest diameter of 0.5 μm or more and less than 2.0 μm are at 5000 particles/mm² or more. Typically, the strength of an aluminum alloy substrate is greatly decreased due to occurrence of grain boundary migration in pressurization annealing. However, the presence of a large number of second phase particles at 5000 particles/mm² or more results in pinning of the grain boundary migration in the pressurization annealing and therefore enables a high strength to be maintained.

When the second phase particles existing in the metal structure of the aluminum alloy substrate according to the present disclosure have a longest diameter of 2.0 μm or more, the effect of maintaining the high strength becomes insufficient because heterogeneous deformation occurs in the peripheries of the second phase particles in rolling such as cold rolling, whereby recrystallization becomes prone to occur in pressurization annealing. In contrast, when the second phase particles have a longest diameter of less than 0.5 μm, the effect of maintaining the high strength becomes insufficient because the effect of pinning grain boundary migration is precluded due to the small longest diameter of the second phase particles. Accordingly, the longest diameter of the second phase particles existing in the metal structure of the aluminum alloy substrate is set in a range of 0.5 μm or more and less than 2.0 μm. The longest diameter of the second phase particles is preferably in a range of 0.5 to less than 1.5 μm.

When the second phase particles having a longest diameter of 0.5 μm or more and less than 2.0 μm are at less than 5000 particles/mm² in the metal structure of the aluminum alloy substrate according to the present disclosure, the effect of maintaining the high strength becomes insufficient because the second phase particles having a longest diameter of 0.5 μm or more and less than 2.0 μm, giving the effect of pinning grain boundary migration, are few in number. Accordingly, the second phase particles having a longest diameter of 0.5 μm or more and less than 2.0 μm are allowed to be dispersed at a distribution density of 5000 particles/mm² or more in the metal structure of the aluminum alloy substrate according to the present disclosure. The distribution density is preferably in a range of 10000 particles/mm² or more, and more preferably in a range of 30000 particles/mm² or more, in view of improving strength. The upper limit value of the distribution density is not particularly limited but is logically determined depending on the composition of an aluminum alloy used and on a method for producing the aluminum alloy, and is around 200000 particles/mm² in the present disclosure.

In a planar image of second phase particles observed with an optical microscope, first, a maximum value of the distance between one point on a contour and another point on the contour is measured, such maximum values with regard to all the points on the contour are then measured, and the highest value is finally selected from all the maximum values; and the longest diameter refers to the highest value in the present disclosure.

3. Fluttering Characteristic

Fluttering characteristics are also influenced by the motor characteristics of a hard disk drive. In the present disclosure, the fluttering characteristic is preferably 50 nm or less, and more preferably 30 nm or less, in air. A fluttering characteristic of 50 nm or less is considered to be acceptable for use for common HDDs. A fluttering characteristic of more than 50 nm results in an increase in the positioning error of a head which is a reader.

In addition, the fluttering characteristic is preferably 30 nm or less, and more preferably 20 nm or less, in helium. A fluttering characteristic of 30 nm or less was considered to be acceptable for use for use for HDDs having higher-density recording capacities. A fluttering characteristic of more than 30 nm results in an increase in the positioning error of the head which is the reader.

A required fluttering characteristic varies according to a hard disk drive used, and therefore, the distribution state of the second phase particles may be determined as appropriate on the basis of the fluttering characteristic. Such fluttering characteristics can be obtained by appropriately adjusting each of the contents of added elements described below, a casting method including a cooling rate in casting, and a heat history and a working history in subsequent heat treatment and working.

In an embodiment of the present disclosure, the thickness of the aluminum alloy sheet is preferably 0.45 mm or more. When the thickness of the aluminum alloy sheet is less than 0.45 mm, the substrate may be deformed by accelerating force caused by, for example, drop occurring in, for example, installation of a hard disk drive, except in a case in which the deformation can be inhibited by further increasing proof stress. A case in which the thickness of the aluminum alloy sheet is more than 1.30 mm is not preferred because of resulting in a decrease in the number of disks that can be mounted in a hard disk although resulting in improvement in fluttering characteristic. Accordingly, the thickness of the aluminum alloy sheet is more preferably set at 0.45 to 1.30 mm, and still more preferably set at 0.50 to 1.00 mm.

Fluid force can be decreased by filling helium into a hard disk. This is because the gas viscosity of helium is as low as about ⅛ of the gas viscosity of air. Fluttering generated by gas flow associated with the rotation of the hard disk is reduced by decreasing the fluid force of the gas.

4. Crystal Particle Diameter

The average crystal particle diameter of a cross section of the aluminum alloy substrate according to the present disclosure in a sheet thickness direction will now be described.

The average crystal particle diameter of a cross section of the aluminum alloy substrate according to the present disclosure in a sheet thickness direction is preferably 70 μm or less. When the average crystal particle diameter is 70 μm or less, the effect of still more improvement in the strength of the aluminum alloy substrate is exhibited. In such a case, the cross section represents an L-ST cross section (cross section in rolling and sheet thickness directions). Crystal grains are stretched in the rolling direction of a sheet material in a rolling step, and therefore, after rolling working, crystal particle diameters in the sheet thickness direction are smaller than crystal particle diameters in the rolling direction and the direction orthogonal to the rolling direction (also orthogonal to the sheet thickness direction). In such a case, when recrystallized grains are formed in a pressurization annealing step performed after the rolling working, the crystal particle diameters of the recrystallized grains are increased.

When the average crystal particle diameter is more than 70 μm, strength may be decreased by coarsening of crystal grains. When the strength of the aluminum alloy substrate is low, the aluminum alloy substrate may be deformed due to application of external force in, for example, conveyance or installation of the aluminum alloy substrate. Therefore, the average crystal particle diameter of the aluminum alloy substrate is preferably set at 70 µm or less, and more preferably set at 50 µm or less. The lower limit value of the average crystal particle diameter is not particularly limited but is logically determined depending on the composition of the aluminum alloy used and on a method for producing the aluminum alloy, and is around 1 µm in the present disclosure.

The average crystal particle diameter of a cross section of the aluminum alloy substrate according to the present disclosure in a sheet thickness direction is measured as described below. A cross section (L-ST cross section) of an aluminum alloy substrate subjected to grinding work (step S107) was subjected to Barker etching using a Barker liquid, and one visual field of the cross section was photographed with a polarizing microscope at a magnification of 200 times so that the visual field contains a full thickness. The crystal particle diameters are measured by drawing five straight lines of 1000 µm in the ST direction in an intersection method in which the number of crossing crystal grains existing in the full sheet thickness along the sheet thickness direction is counted. The arithmetic average value of such measurement values is regarded as the average crystal particle diameter.

5. Proof Stress

The proof stress of the aluminum alloy substrate according to the present disclosure will now be described.

The aluminum alloy substrate according to the present disclosure, heated at 340° C. for three hours in atmospheric air, preferably has a proof stress of 60 MPa or more: In such a case, the effect of still more inhibition of the deformation of the substrate in production of a magnetic disk is exhibited. When the proof stress of the aluminum alloy substrate is low, the aluminum alloy substrate may be deformed due to application of external force in, for example, the conveyance or installation of the aluminum alloy substrate. Therefore, the proof stress of the aluminum alloy substrate heated at 340° C. for three hours in atmospheric air is preferably 60 MPa or more, and more preferably 75 MPa or more. Since heat treatment is performed at a maximum of less than 350° C. in steps from the production of the substrate for a magnetic disk (step S107 of FIG. 1) to the deposition of the magnetic substance (step S110 of FIG. 1), the proof stress is defined in the case of the heating at 340° C. The upper limit of the proof stress is not particularly limited but is logically determined depending on the composition of the alloy and on production conditions, and is around 250 MPa in the present disclosure.

B. Method for Producing Aluminum Alloy Substrate According to Present Disclosure Each of steps for producing the aluminum alloy substrate according to the present disclosure, and the process conditions of the steps will be described in detail below.

A method for producing the aluminum alloy substrate according to the present disclosure will be described with reference to a flow illustrated in FIG. 1. In such a case, preparation of aluminum alloy components (step S101) to cold rolling (step S104) are steps for producing an aluminum alloy substrate, and production of a disk blank (step S105) to deposition of a magnetic substance (step S110) are steps for making the produced aluminum alloy substrate into a magnetic disk.

6. Preparation and Casting of Aluminum Alloy Components

First, a molten metal of an aluminum alloy material having the component composition described above is prepared by heating and melting according to a usual method (step S101). Then, a thin aluminum alloy sheet of around 2.0 to 10.0 mm is cast from the prepared molten metal of the aluminum alloy material by a continuous casting method (CC method) (step S102).

In the CC method, the molten metal is supplied into between a pair of rolls (or a belt caster and a block caster) through a casting nozzle, and the cast sheet of the aluminum alloy is directly cast by removal of heat from the rolls.

In the casting of the thin aluminum alloy sheet by the CC method, the temperature of the cast sheet after a lapse of 1 minute after the casting is set at 230 to 350° C., and preferably set at 240 to 340° C. Further, the temperature of the cast sheet after a lapse of 10 minutes after the casting is set at 150° C. or more and less than 230° C., and preferably set at 160 to 220° C. A large number of fine second phase particles (primarily, an Al—Fe-based compound) can be distributed to obtain the effect of improving strength by setting, at 230 to 350° C., the temperature of the cast sheet after a lapse of 1 minute after the casting, and further setting, at 150° C. or more and less than 230° C., the temperature of the cast sheet after a lapse of 10 minutes after the casting, as described above.

In the CC method, the amount of the solid solution of an added element such as Fe becomes large because a cooling rate in solidification is greatly high in comparison with the DC casting method. Therefore, precipitated second phase particles may be coarsened at relatively low temperature in a short time while the cast sheet is cooled from a high temperature of around 600° C. to room temperature after the cast sheet has been cast by the CC method.

When the temperature of the cast sheet is more than 350° C. after a lapse of 1 minute after the casting, the second phase particles are coarsened, thereby decreasing the strength. In contrast, when the temperature of the cast sheet is less than 230° C. after a lapse of 1 minute after the casting, the cooling rate is too high, and therefore, the number of precipitated second phase particles having a longest diameter of 0.5 µm or more and less than 2.0 µm is decreased, thereby decreasing the strength.

When the temperature of the cast sheet is 230° C. or more after a lapse of 10 minutes after the casting, the second phase particles are coarsened, thereby decreasing the strength. When the temperature of the cast sheet is less than 150° C. after a lapse of 10 minutes after the casting, the number of precipitated second phase particles having a longest diameter of 0.5 µm or more and less than 2.0 µm is decreased, thereby decreasing the strength.

For example, a method such as fan air cooling, mist cooling, shower cooling, or water cooling can be adopted as a method for cooling the cast sheet in the CC method.

7. Homogenization Treatment

Then, homogenization treatment of the cast sheet is performed as needed (step S103). Heat treatment conditions in the homogenization treatment are 300 to 450° C. and 0.5 to 24 hours, and preferably 310 to 440° C. and 0.5 to 20 hours. The effect of reducing nonuniformity in the sizes of the second phase particles to reduce unevenness in the strength and fluttering characteristic of the aluminum alloy substrate can be obtained by setting the heat treatment conditions in the homogenization treatment at 300 to 450° C. and 0.5 to 24 hours as described above. A temperature of less than 300° C. in the homogenization treatment prevents the above-described effect from being obtained, while a temperature of more than 450° C. in the homogenization treatment may cause the second phase particles to be coarsened, thereby decreasing the strength. In addition, a homogenization treatment time of less than 0.5 hour prevents the above-described effect from being obtained, while a homogenization treatment time of more than 24 hours may cause the second phase particles to be coarsened, thereby decreasing the strength. In a case in which the temperature close to room temperature is increased to 300 to 450° C., a larger number of fine second phase particles exist than in a case in which the temperature is decreased from high temperature to 300 to 450° C., and therefore, heating at 300 to 450° C. for 24 hours or less can inhibit the coarsening of the second phase particles.

8. Cold Rolling

Then, cold rolling of the sheet material is performed to make an aluminum alloy sheet of around 1.8 mm to 0.45 mm (step S104). The sheet is finished to have a needed product sheet thickness by the cold rolling. The conditions of the cold rolling are not particularly limited but may be determined depending on a needed product sheet strength and sheet thickness, and a rolling reduction is preferably set at 10 to 95%. Before or in the cold rolling, annealing treatment may be performed to secure cold-rolling workability. The annealing treatment is preferably performed under conditions of 200° C. or more and less than 380° C. and 0.1 to 10 hours in the case of, for example, batch-type heating and is preferably performed under conditions of maintenance at 250° C. or more and less than 400° C. for 0 to 60 seconds in the case of continuous heating. In such a case, a treatment time of 0 second in the continuous heating means that the heating is stopped immediately after reaching treatment temperature.

In order to work the aluminum alloy sheet for a magnetic disk, the aluminum alloy sheet is stamped in an annular shape to produce a disk blank (step S105). Then, the disk blank is subjected to pressurization annealing in atmospheric air at 100° C. or more and less than 350° C. for 30 minutes or more to produce a flattened blank (step S106). Then, the blank is subjected to cutting work and grinding work to produce an aluminum alloy substrate (step S107). Then, a surface of the aluminum alloy substrate is subjected to degreasing, etching, and zincate treatment (Zn substitution treatment) (step S108). Then, the surface subjected to the zincate treatment is subjected to Ni—P plating treatment as undercoat treatment (step S109). Finally, a magnetic substance is deposited on the surface subjected to the Ni—P plating treatment by sputtering to make a magnetic disk (step S110).

After the aluminum alloy substrate has been made in step S107, the aluminum alloy substrate is not exposed to a temperature 350° C. or more, and therefore, the kinds and distribution of intermetallic compounds included in the second phase particles are not changed. Accordingly, the kinds and distribution of intermetallic compounds included in the second phase particles may be evaluated by using the aluminum alloy substrate after the step of the Ni—P plating treatment (step S109), or the magnetic disk, instead of the aluminum alloy substrate produced in step S107.

EXAMPLES

The present disclosure will be described in more detail below with reference to examples. However, the present disclosure is not limited thereto.

Each alloy material with component composition set forth in Table 1 to Table 3 was melted to make a molten aluminum alloy according to a usual method (step S101). In Table 1 to Table 3, "-" denotes a measurement limit value or less.

TABLE 1

| Alloy No. | Alloy Composition (mass %) | | | | | | | | | | | | Ti + B + V | Al + unavoidable impurities |
|---|---|---|---|---|---|---|---|---|---|---|---|---|---|---|
| | Fe | Mn | Si | Ni | Cu | Mg | Cr | Zr | Zn | Ti | B | V | | |
| A1 | 0.4 | — | — | — | — | — | — | — | — | — | — | — | 0.000 | Bal. |
| A2 | 0.6 | 0.2 | — | — | — | — | — | — | 0.230 | — | — | — | 0.000 | Bal. |
| A3 | 0.8 | — | 0.2 | — | — | — | — | — | 0.230 | — | — | — | 0.000 | Bal. |
| A4 | 0.9 | — | — | 0.2 | — | — | — | — | 0.230 | — | — | — | 0.000 | Bal. |
| A5 | 1.0 | — | — | — | 0.020 | — | — | — | 0.230 | — | — | — | 0.000 | Bal. |
| A6 | 1.2 | — | — | — | — | 0.2 | — | — | 0.230 | — | — | — | 0.000 | Bal. |
| A7 | 1.5 | — | — | — | — | — | 0.20 | — | 0.230 | — | — | — | 0.000 | Bal. |
| A8 | 1.8 | — | — | — | — | — | — | 0.20 | 0.230 | — | — | — | 0.000 | Bal. |
| A9 | 2.0 | — | — | — | — | — | — | — | 0.230 | — | — | — | 0.000 | Bal. |
| A10 | 2.9 | — | — | — | — | — | — | — | 0.230 | 0.060 | 0.001 | 0.020 | 0.081 | Bal. |
| A11 | 1.5 | 0.1 | — | — | — | — | — | — | 0.230 | — | — | — | 0.000 | Bal. |
| A12 | 1.5 | 0.3 | — | — | — | — | — | — | 0.230 | — | — | — | 0.000 | Bal. |
| A13 | 1.5 | 0.6 | — | — | — | — | — | — | 0.230 | — | — | — | 0.000 | Bal. |
| A14 | 1.5 | 1.5 | — | — | — | — | — | — | 0.230 | — | — | — | 0.000 | Bal. |
| A15 | 1.5 | 2.9 | — | — | — | — | — | — | 0.230 | — | — | — | 0.000 | Bal. |
| A16 | 1.5 | — | 0.1 | — | — | — | — | — | 0.230 | — | — | — | 0.000 | Bal. |
| A17 | 1.5 | — | 0.4 | — | — | — | — | — | 0.230 | — | — | — | 0.000 | Bal. |
| A18 | 1.5 | — | — | 0.1 | — | — | — | — | 0.230 | — | — | — | 0.000 | Bal. |
| A19 | 1.5 | — | — | 1.0 | — | — | — | — | 0.230 | — | — | — | 0.000 | Bal. |
| A20 | 1.5 | — | — | 2.9 | — | — | — | — | 0.230 | — | — | — | 0.000 | Bal. |
| A21 | 1.5 | — | — | — | 0.005 | — | — | — | 0.230 | — | — | — | 0.000 | Bal. |
| A22 | 1.5 | — | — | — | 0.021 | — | — | — | 0.230 | — | — | — | 0.000 | Bal. |
| A23 | 1.5 | — | — | — | 0.152 | — | — | — | 0.230 | — | — | — | 0.000 | Bal. |
| A24 | 1.5 | — | — | — | 0.953 | — | — | — | 0.230 | — | — | — | 0.000 | Bal. |
| A25 | 1.5 | — | — | — | — | 0.1 | — | — | 0.230 | — | — | — | 0.000 | Bal. |
| A26 | 1.5 | — | — | — | — | 0.9 | — | — | 0.230 | — | — | — | 0.000 | Bal. |
| A27 | 0.4 | — | — | — | — | 6.0 | — | — | 0.230 | — | — | — | 0.000 | Bal. |

TABLE 1-continued

| Alloy No. | Alloy Composition (mass %) |
|---|---|

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| A28 | 1.5 | — | — | — | — | — | 0.01 | — | 0.230 | — | — | — | 0.000 | Bal. |
| A29 | 1.5 | — | — | — | — | — | 0.15 | — | 0.230 | — | — | — | 0.000 | Bal. |
| A30 | 1.5 | — | — | — | — | — | 0.95 | — | 0.230 | — | — | — | 0.000 | Bal. |

TABLE 2

| Alloy No. | Alloy Composition (mass %) |
|---|---|

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| A31 | 1.5 | — | — | — | — | — | — | 0.01 | 0.230 | — | — | — | 0.000 | Bal. |
| A32 | 1.8 | — | — | — | — | — | — | 0.15 | 0.230 | — | — | — | 0.000 | Bal. |
| A33 | 1.8 | — | — | — | — | — | — | 0.95 | 0.230 | — | — | — | 0.000 | Bal. |
| A34 | 1.8 | — | — | — | — | — | — | — | 0.005 | — | — | — | 0.000 | Bal. |
| A35 | 1.5 | — | — | — | — | — | — | — | 0.350 | — | — | — | 0.000 | Bal. |
| A36 | 1.5 | — | — | — | — | — | — | — | 0.950 | — | — | — | 0.000 | Bal. |
| A37 | 0.8 | 0.3 | 0.1 | 0.1 | 0.020 | 0.3 | 0.15 | 0.15 | 0.350 | 0.006 | 0.001 | 0.001 | 0.008 | Bal. |
| A38 | 1.5 | 0.3 | 0.1 | 0.1 | 0.021 | 0.3 | 0.15 | 0.15 | 0.350 | 0.071 | 0.001 | 0.022 | 0.094 | Bal. |
| A39 | 2.3 | 0.3 | 0.1 | 0.1 | 0.023 | 0.3 | 0.15 | 0.15 | 0.350 | 0.453 | 0.022 | 0.011 | 0.486 | Bal. |
| A40 | 0.8 | — | — | — | — | — | — | — | — | — | — | — | 0.000 | Bal. |
| A41 | 1.2 | — | — | — | — | — | — | — | — | — | — | — | 0.000 | Bal. |
| A42 | 2.9 | — | — | — | — | — | — | — | — | — | — | — | 0.000 | Bal. |

TABLE 3

| Alloy No. | Alloy Composition (mass %) |
|---|---|

| Alloy No. | Fe | Mn | Si | Ni | Cu | Mg | Cr | Zr | Zn | Ti | B | V | Ti + B + V | Al + unavoidable impurities |
|---|---|---|---|---|---|---|---|---|---|---|---|---|---|---|
| AC1 | 0.2 | — | — | — | — | — | — | — | — | — | — | — | 0.000 | Bal. |
| AC2 | 0.2 | — | — | — | — | — | — | — | — | — | — | — | 0.000 | Bal. |
| AC3 | 0.3 | — | — | — | — | — | — | — | — | — | — | — | 0.000 | Bal. |
| AC4 | 3.5 | — | — | — | — | — | — | — | — | — | — | — | 0.000 | Bal. |
| AC5 | 4.0 | — | — | — | — | — | — | — | — | — | — | — | 0.000 | Bal. |
| AC6 | 0.4 | — | — | — | — | — | — | — | — | — | — | — | 0.000 | Bal. |
| AC7 | 0.5 | — | — | — | — | — | — | — | — | — | — | — | 0.000 | Bal. |
| AC8 | 0.6 | — | — | — | — | — | — | — | — | — | — | — | 0.000 | Bal. |
| AC9 | 0.8 | — | — | — | — | — | — | — | — | — | — | — | 0.000 | Bal. |
| AC10 | 0.9 | — | — | — | — | — | — | — | — | — | — | — | 0.000 | Bal. |
| AC11 | 1.0 | — | — | — | — | — | — | — | — | — | — | — | 0.000 | Bal. |
| AC12 | 1.1 | — | — | — | — | — | — | — | — | — | — | — | 0.000 | Bal. |
| AC13 | 0.4 | — | — | — | — | — | — | — | — | — | — | — | 0.000 | Bal. |
| AC14 | 0.5 | — | — | — | — | — | — | — | — | — | — | — | 0.000 | Bal. |
| AC15 | 0.4 | — | — | — | — | — | — | — | — | — | — | — | 0.000 | Bal. |
| AC16 | 0.5 | — | — | — | — | — | — | — | — | — | — | — | 0.000 | Bal. |
| AC17 | 0.4 | — | — | — | — | — | — | — | — | — | — | — | 0.000 | Bal. |
| AC18 | 0.5 | — | — | — | — | — | — | — | — | — | — | — | 0.000 | Bal. |
| AC19 | 0.8 | 3.5 | — | — | — | — | — | — | — | — | — | — | 0.000 | Bal. |
| AC20 | 0.8 | — | 0.7 | — | — | — | — | — | — | — | — | — | 0.000 | Bal. |
| AC21 | 0.8 | — | — | 3.6 | — | — | — | — | — | — | — | — | 0.000 | Bal. |
| AC22 | 0.8 | — | — | — | 1.520 | — | — | — | — | — | — | — | 0.000 | Bal. |
| AC23 | 0.8 | — | — | — | — | 7.2 | — | — | — | — | — | — | 0.000 | Bal. |
| AC24 | 0.8 | — | — | — | — | — | 1.40 | — | — | — | — | — | 0.000 | Bal. |
| AC25 | 0.8 | — | — | — | — | — | — | 1.38 | — | — | — | — | 0.000 | Bal. |
| AC26 | 0.8 | — | — | — | — | — | — | — | 1.520 | — | — | — | 0.000 | Bal. |

Then, the molten aluminum alloy was cast to produce a cast sheet by a CC method (step S102). The thickness of the cast sheet, the temperature of the cast sheet after a lapse of 1 minute after the casting, and the temperature of the cast sheet after a lapse of 10 minutes after the casting are set forth in Tables 4 to 6. The alloy Nos. A8 to A10 and AC8 to AC12 were subjected to homogenization treatment (step S103). Similarly, the conditions of the homogenization treatment are set forth in Tables 4 to 6.

TABLE 4

| | Alloy No. | Thickness of Cast Sheet (mm) | Temperature after Lapse of 1 Minute after Casting (° C.) | Temperature after Lapse of 10 Minutes after Casting (° C.) | Homogenization Treatment Conditions | |
|---|---|---|---|---|---|---|
| | | | | | Heating Temperature (° C.) | Retention Time (hr) |
| Example 1 | A1 | 5 | 248 | 178 | — | — |
| Example 2 | A2 | 5 | 281 | 210 | — | — |
| Example 3 | A3 | 5 | 321 | 213 | — | — |
| Example 4 | A4 | 10 | 343 | 225 | — | — |
| Example 5 | A5 | 5 | 237 | 155 | — | — |
| Example 6 | A6 | 8 | 242 | 172 | — | — |
| Example 7 | A7 | 3 | 266 | 196 | — | — |
| Example 8 | A8 | 5 | 284 | 207 | 440 | 0.5 |
| Example 9 | A9 | 5 | 263 | 190 | 310 | 20 |
| Example 10 | A10 | 5 | 245 | 173 | 380 | 5 |
| Example 11 | A11 | 5 | 245 | 167 | — | — |
| Example 12 | A12 | 5 | 243 | 166 | — | — |
| Example 13 | A13 | 5 | 286 | 208 | — | — |
| Example 14 | A14 | 5 | 281 | 207 | — | — |
| Example 15 | A15 | 5 | 279 | 209 | — | — |
| Example 16 | A16 | 5 | 285 | 214 | — | — |
| Example 17 | A17 | 5 | 276 | 205 | — | — |
| Example 18 | A18 | 5 | 258 | 183 | — | — |
| Example 19 | A19 | 5 | 275 | 201 | — | — |
| Example 20 | A20 | 5 | 242 | 167 | — | — |
| Example 21 | A21 | 5 | 262 | 185 | — | — |
| Example 22 | A22 | 5 | 274 | 197 | — | — |
| Example 23 | A23 | 5 | 242 | 168 | — | — |
| Example 24 | A24 | 5 | 277 | 207 | — | — |
| Example 25 | A25 | 5 | 259 | 189 | — | — |
| Example 26 | A26 | 5 | 244 | 169 | — | — |
| Example 27 | A27 | 5 | 279 | 206 | — | — |
| Example 28 | A28 | 5 | 281 | 210 | — | — |
| Example 29 | A29 | 5 | 265 | 186 | — | — |
| Example 30 | A30 | 5 | 287 | 214 | — | — |

TABLE 5

| | Alloy No. | Thickness of cast sheet (mm) | Temperature after Lapse of 1 Minute after Casting (° C.) | Temperature after Lapse of 10 Minutes after Casting (° C.) | Homogenization Treatment Conditions | |
|---|---|---|---|---|---|---|
| | | | | | Heating Temperature (° C.) | Retention Time (hr) |
| Example 31 | A31 | 5 | 268 | 190 | — | — |
| Example 32 | A32 | 5 | 256 | 182 | — | — |
| Example 33 | A33 | 5 | 251 | 177 | — | — |
| Example 34 | A34 | 5 | 263 | 188 | — | — |
| Example 35 | A35 | 5 | 263 | 189 | — | — |
| Example 36 | A36 | 5 | 288 | 217 | — | — |
| Example 37 | A37 | 5 | 280 | 205 | — | — |
| Example 38 | A38 | 5 | 257 | 185 | — | — |
| Example 39 | A39 | 5 | 270 | 191 | — | — |
| Example 40 | A40 | 5 | 269 | 201 | — | — |
| Example 41 | A41 | 5 | 256 | 187 | — | — |
| Example 42 | A42 | 5 | 288 | 193 | — | — |

TABLE 6

| | Alloy No. | Thickness of cast sheet (mm) | Temperature after Lapse of 1 Minute after Casting (° C.) | Temperature after Lapse of 10 Minutes after Casting (° C.) | Homogenization Treatment Conditions | |
|---|---|---|---|---|---|---|
| | | | | | Heating Temperature (° C.) | Retention Time (hr) |
| Comparative Example 1 | AC1 | 5 | 279 | 206 | — | — |
| Comparative Example 2 | AC2 | 5 | 269 | 194 | — | — |

TABLE 6-continued

|  | Alloy No. | Thickness of cast sheet (mm) | Temperature after Lapse of 1 Minute after Casting (° C.) | Temperature after Lapse of 10 Minutes after Casting (° C.) | Homogenization Treatment Conditions | |
|---|---|---|---|---|---|---|
|  |  |  |  |  | Heating Temperature (° C.) | Retention Time (hr) |
| Comparative Example 3 | AC3 | 5 | 268 | 192 | — | — |
| Comparative Example 4 | AC4 | 5 | 254 | 180 | — | — |
| Comparative Example 5 | AC5 | 5 | 254 | 178 | — | — |
| Comparative Example 6 | AC6 | 10 | 378 | 221 | — | — |
| Comparative Example 7 | AC7 | 8 | 382 | 201 | — | — |
| Comparative Example 8 | AC8 | 3 | 272 | 202 | 440 | 30 |
| Comparative Example 9 | AC9 | 3 | 284 | 212 | 440 | 48 |
| Comparative Example 10 | AC10 | 3 | 265 | 190 | 485 | 5 |
| Comparative Example 11 | AC11 | 3 | 280 | 201 | 520 | 5 |
| Comparative Example 12 | AC12 | 3 | 253 | 175 | 550 | 5 |
| Comparative Example 13 | AC13 | 3 | 212 | 164 | — | — |
| Comparative Example 14 | AC14 | 3 | 209 | 160 | — | — |
| Comparative Example 15 | AC15 | 3 | 341 | 263 | — | — |
| Comparative Example 16 | AC16 | 3 | 331 | 271 | — | — |
| Comparative Example 17 | AC17 | 3 | 240 | 130 | — | — |
| Comparative Example 18 | AC18 | 3 | 251 | 120 | — | — |
| Comparative Example 19 | AC19 | 3 | 282 | 207 | — | — |
| Comparative Example 20 | AC20 | 3 | 279 | 208 | — | — |
| Comparative Example 21 | AC21 | 3 | 254 | 209 | — | — |
| Comparative Example 22 | AC22 | 3 | 271 | 209 | — | — |
| Comparative Example 23 | AC23 | 3 | 247 | 201 | — | — |
| Comparative Example 24 | AC24 | 3 | 245 | 201 | — | — |
| Comparative Example 25 | AC25 | 3 | 286 | 208 | — | — |
| Comparative Example 26 | AC26 | 3 | 276 | 203 | — | — |

Then, all the sheet materials subjected to and not to the homogenization treatment were rolled to have a final sheet thickness of 0.8 mm by cold rolling, to make aluminum alloy sheets (step S104). Annealing treatment was performed in the cold rolling (sheet thickness of 3.0 mm) in Examples 3 to 6 and before the cold rolling in Example 11. The annealing treatment was performed in a batch-type heating furnace under conditions of 200° C. and 9.5 hours in Example 3, in a batch-type heating furnace under conditions of 370° C. and 0.1 hour in Example 4, in a continuous heating furnace under conditions of 250° C. and 60 seconds in Example 5, in a continuous heating furnace under conditions of 390° C. and 0 second in Example 6, and in a batch-type heating furnace under conditions of 250° C. and 3.0 hours in Example 11. Disk blanks were stamped and produced to have an annular shape with an outer diameter of 96 mm and an inner diameter of 24 mm from the aluminum alloy sheets (step S105).

The disk blank produced in such a manner was subjected to pressurization annealing at 340° C. for 3 hours (step S106). The disk blank was subjected to end-surface preparation to have an outer diameter of 95 mm and an inner diameter of 25 mm and subjected to grinding working (grinding of surface of 10 μm) (step S107). Then, the disk blank was degreased at 60° C. for 5 minutes by AD-68F (trade name, manufactured by C. Uyemura & Co., Ltd.), etched at 65° C. for 1 minute by AD-107F (trade name, manufactured by C. Uyemura & Co., Ltd.), and further desmutted with 30% HNO$_3$ aqueous solution (room temperature) for 20 seconds (step S108).

The disk blank of which a surface state had been prepared in such a manner was immersed in a zincate treatment liquid, at 20° C., of AD-301F-3X (trade name, manufactured by C. Uyemura & Co., Ltd.) for 0.5 minutes to perform zincate treatment of the surface (step S108). The zincate treatment was performed twice in total, and the disk blank was immersed in 30% HNO₃ aqueous solution at room temperature for 20 seconds between such zincate treatments to subject the surface to peeling treatment. The surface subjected to the zincate treatment was electroless plated with Ni—P of 16 μm in thickness using an electroless Ni—P plating treatment liquid (NIMUDEN HDX (trade name, manufactured by C. Uyemura & Co., Ltd.)) and then subjected to final polishing (polishing quantity of 4 μm) by a fabric (step S109).

Each sample of the aluminum alloy sheet subjected to the cold rolling (step S104), the aluminum alloy substrate subjected to the grinding work (step S107) step, and the aluminum alloy substrate subjected to the plating treatment polishing (step S109) step was subjected to the following evaluations. Plating treatment of three disks produced under the same conditions was performed in each sample. Plating peeling occurred in all the three disks in Comparative Examples 4, 5, and 19 to 26. Therefore, it was impossible to evaluate strength and fluttering characteristics in these Comparative Examples. In Examples 1, and 40 to 42, plating peeling occurred in one of the three disks, but the evaluations were performed using the two disks in which the plating peeling had not occurred.

[Distribution Density of Second Phase Particles Having Longest Diameter of 0.5 μm or More and Less than 2.0 μm]

A visual field of 1 mm² in a cross section of the aluminum alloy substrate subjected to the grinding work (step S107) was observed with an optical microscope at a magnification of 1000 times, to measure the distribution density (particles/mm²) of second phase particles by using particle analysis software A-ZO-KUN (trade name, manufactured by Asahi Kasei Engineering Corporation). The observation was performed in the vicinity of ¼ of the sheet thickness from a surface along an L-ST cross section (cross section in rolling and sheet thickness directions) (a spot of 0.2 mm from the surface in the sheet thickness direction) of the aluminum alloy substrate. The results are set forth in Tables 7 to 9.

TABLE 7

| | Alloy No. | Distribution Density of Second Phase Particles (particles/mm²) | Average Crystal Particle Diameter of Cross Section in Sheet Thickness Direction (μm) | Strength Proof Stress (MPa) | Evaluation | Fluttering Characteristic |
|---|---|---|---|---|---|---|
| Example 1 | A1 | 5341 | 62 | 65 | B | C |
| Example 2 | A2 | 13021 | 48 | 78 | A | B |
| Example 3 | A3 | 24985 | 43 | 81 | A | A |
| Example 4 | A4 | 28108 | 15 | 92 | A | A |
| Example 5 | A5 | 31231 | 21 | 105 | A | A |
| Example 6 | A6 | 37477 | 31 | 120 | A | A |
| Example 7 | A7 | 46847 | 44 | 150 | A | A |
| Example 8 | A8 | 56216 | 40 | 185 | A | A |
| Example 9 | A9 | 62462 | 43 | 200 | A | A |
| Example 10 | A10 | 90570 | 43 | 212 | A | A |
| Example 11 | A11 | 49970 | 33 | 160 | A | A |
| Example 12 | A12 | 56216 | 20 | 180 | A | A |
| Example 13 | A13 | 65585 | 12 | 213 | A | A |
| Example 14 | A14 | 93693 | 41 | 234 | A | A |
| Example 15 | A15 | 137416 | 14 | 251 | A | A |
| Example 16 | A16 | 49970 | 13 | 158 | A | A |
| Example 17 | A17 | 59339 | 22 | 178 | A | A |
| Example 18 | A18 | 49970 | 21 | 160 | A | A |
| Example 19 | A19 | 78078 | 41 | 189 | A | A |
| Example 20 | A20 | 137416 | 14 | 212 | A | A |
| Example 21 | A21 | 47003 | 34 | 150 | A | A |
| Example 22 | A22 | 47502 | 1 | 152 | A | A |
| Example 23 | A23 | 51594 | 12 | 165 | A | A |
| Example 24 | A24 | 76610 | 19 | 189 | A | A |
| Example 25 | A25 | 49970 | 21 | 160 | A | A |
| Example 26 | A26 | 74954 | 44 | 182 | A | A |
| Example 27 | A27 | 199878 | 10 | 231 | A | A |
| Example 28 | A28 | 47159 | 33 | 151 | A | A |
| Example 29 | A29 | 51531 | 23 | 165 | A | A |
| Example 30 | A30 | 76516 | 35 | 212 | A | A |

TABLE 8

| | Alloy No. | Distribution Density of Second Phase Particles (particles/mm²) | Average Crystal Particle Diameter of Cross Section in Sheet Thickness Direction (μm) | Strength Proof Stress (MPa) | Evaluation | Fluttering Characteristic |
|---|---|---|---|---|---|---|
| Example 31 | A31 | 47159 | 28 | 151 | A | A |
| Example 32 | A32 | 60900 | 26 | 195 | A | A |
| Example 33 | A33 | 85885 | 28 | 243 | A | A |
| Example 34 | A34 | 56372 | 41 | 180 | A | A |
| Example 35 | A35 | 57777 | 14 | 185 | A | A |
| Example 36 | A36 | 76516 | 10 | 194 | A | A |

TABLE 8-continued

| | Alloy No. | Distribution Density of Second Phase Particles (particles/mm$^2$) | Average Crystal Particle Diameter of Cross Section in Sheet Thickness Direction (μm) | Proof Stress (MPa) | Evaluation | Fluttering Characteristic |
|---|---|---|---|---|---|---|
| Example 37 | A37 | 71144 | 38 | 125 | A | A |
| Example 38 | A38 | 95723 | 37 | 182 | A | A |
| Example 39 | A39 | 133013 | 38 | 212 | A | A |
| Example 40 | A40 | 24382 | 47 | 80 | A | A |
| Example 41 | A41 | 38391 | 42 | 123 | A | A |
| Example 42 | A42 | 92542 | 41 | 190 | A | A |

TABLE 9

| | Alloy No. | Distribution Density of Second Phase Particles (particles/mm$^2$) | Average Crystal Particle Diameter of Cross Section in Sheet Thickness Direction (μm) | Proof Stress (MPa) | Evaluation | Fluttering Characteristic |
|---|---|---|---|---|---|---|
| Comparative Example 1 | AC1 | 2341 | 89 | 38 | C | D |
| Comparative Example 2 | AC2 | 2190 | 80 | 39 | C | D |
| Comparative Example 3 | AC3 | 3121 | 78 | 51 | C | D |
| Comparative Example 4 | AC4 | — | — | — | — | — |
| Comparative Example 5 | AC5 | — | — | — | — | — |
| Comparative Example 6 | AC6 | 2987 | 89 | 38 | C | A |
| Comparative Example 7 | AC7 | 3212 | 93 | 42 | C | A |
| Comparative Example 8 | ACB | 3213 | 89 | 43 | C | A |
| Comparative Example 9 | AC9 | 3021 | 87 | 45 | C | A |
| Comparative Example 10 | AC10 | 3321 | 81 | 50 | C | A |
| Comparative Example 11 | AC11 | 3452 | 82 | 49 | C | A |
| Comparative Example 12 | AC12 | 3821 | 78 | 51 | C | A |
| Comparative Example 13 | AC13 | 3212 | 63 | 54 | C | A |
| Comparative Example 14 | AC14 | 3456 | 65 | 55 | C | A |
| Comparative Example 15 | AC15 | 3516 | 61 | 55 | C | A |
| Comparative Example 16 | AC16 | 3556 | 62 | 53 | C | A |
| Comparative Example 17 | AC17 | 3651 | 65 | 52 | C | A |
| Comparative Example 18 | AC18 | 3728 | 63 | 51 | C | A |
| Comparative Example 19 | AC19 | — | — | — | — | — |
| Comparative Example 20 | AC20 | — | — | — | — | — |
| Comparative Example 21 | AC21 | — | — | — | — | — |
| Comparative Example 22 | AC22 | — | — | — | — | — |
| Comparative Example 23 | AC23 | — | — | — | — | — |
| Comparative Example 24 | AC24 | — | — | — | — | — |
| Comparative Example 25 | AC25 | — | — | — | — | — |
| Comparative Example 26 | AC26 | — | — | — | — | — |

[Average Crystal Particle Diameter of Cross Section in Sheet Thickness Direction]

A cross section (L-ST cross section) of the aluminum alloy substrate subjected to the grinding work (step S107) was subjected to Barker etching using a Barker liquid, and one visual field of the cross section was photographed with a polarizing microscope at a magnification of 200 times so that the visual field contains a full thickness. The crystal particle diameters were measured by drawing five straight lines of 1000 µm in the ST direction in an intersection method in which the number of crossing crystal grains existing in the full sheet thickness along the sheet thickness direction was counted. The arithmetic average value of the crystal particle diameters was regarded as an average crystal particle diameter. The results are set forth in Table 7 to 9.

[Proof Stress]

Proof stress was measured in conformity with JIS Z2241 by performing annealing (pressurization annealing simulated heating), at 340° C. for 3 hours, of the aluminum alloy sheet subjected to the cold rolling (step S104), heating the aluminum alloy sheet in atmospheric air at 340° C. for 3 hours, sampling JIS No. 5 test pieces along the rolling direction, and setting n=2. In the evaluation of the strength, a proof stress of 75 MPa or more was evaluated as A (excellent), a proof stress of 60 MPa or more and less than 75 MPa was evaluated as B (good), and a proof stress of less than 60 MPa was evaluated as C (poor). The plating of the aluminum alloy substrate and the magnetic disk after the grinding work may be peeled to sample a test piece from the substrate of which the surface of 10 µm was ground. It is also possible to evaluate proof stress by heating the test piece in atmospheric air at 340° C. for 3 hours. As the dimensions of the test piece in such a case, the width of a parallel portion is set at 5±0.14 mm, the original gage length of the test piece is set at 10 mm, the radius of the shoulder is set at 2.5 mm, and the length of the parallel portion is set at 15 mm. The results are set forth in Tables 7 to 9.

[Measurement of Disk Flutter]

Disk flutter was measured using the aluminum alloy substrate subjected to the plating treatment polishing (step S109) step. The disk flutter was measured by placing the aluminum alloy substrate on a commercially available hard disk drive in the presence of air. ST2000 (trade name) manufactured by Seagate was used as the drive, and a motor to which SLD102 (trade name) manufactured by Techno Alive Co. was directly connected was driven. Plural disks at a rotation number set at 7200 rpm were always placed, and the vibrations of a surface of the top magnetic disk of the disks were observed with LDV1800 (trade name), as a laser Doppler meter, manufactured by ONO SOKKI CO., LTD. The observed vibrations were subjected to spectrum analysis with an FFT analysis apparatus DS3200 (trade name) manufactured by ONO SOKKI CO., LTD. The observation was performed by observing the disk surface through a hole opened in the lid of the hard disk drive. In addition, a squeeze plate placed in the commercially available hard disk was removed, and the evaluation was performed.

A fluttering characteristic was evaluated with the maximum displacement (disk fluttering (nm)) of a broad peak in the vicinity of 300 to 1500 Hz at which fluttering appears. Such a broad peak, referred to as non-repeatable run out (NRRO), has been found to greatly influence the positioning error of a head. In air, a fluttering characteristic of 30 nm or less was evaluated as A (excellent), a fluttering characteristic of more than 30 nm and 40 nm or less was evaluated as B (good), a fluttering characteristic of more than 40 nm and 50 nm or less was evaluated as C (fair), and a fluttering characteristic of more than 50 nm was evaluated as D (poor). The results are set forth in Tables 7 to 9.

As set forth in Tables 7 to 9, Examples 1 to 42 were able to result in favorable strength and fluttering characteristic. In contrast, Comparative Examples 1 to 26 resulted in both poor strength and poor fluttering characteristic or in poor strength, or resulted in peeling of plating, thereby preventing a strength and a fluttering characteristic from being evaluated.

In contrast, Comparative Examples 1 to 3 resulted in the too low distribution density of second phase particles having a longest diameter of 0.5 µm or more and less than 2.0 µm due to the too small content of Fe. As a result, a strength and a fluttering characteristic were poor.

Comparative Examples 4 and 5 resulted in peeling of plating due to the too large content of Fe, thereby preventing a strength and a fluttering characteristic from being evaluated.

Comparative Examples 6 and 7 resulted in the too low distribution density of second phase particles having a longest diameter of 0.5 µm or more and less than 2.0 µm due to the too high temperature of a cast sheet after a lapse of 1 minute after casting. As a result, a strength was poor.

Comparative Examples 8 and 9 resulted in the too low distribution density of second phase particles having a longest diameter of 0.5 µm or more and less than 2.0 µm due to too long homogenization treatment time. As a result, a strength was poor.

Comparative Examples 10 to 12 resulted in the too low distribution density of second phase particles having a longest diameter of 0.5 µm or more and less than 2.0 µm due to too high homogenization treatment temperature. As a result, a strength was poor.

Comparative Examples 13 and 14 resulted in the too low distribution density of second phase particles having a longest diameter of 0.5 µm or more and less than 2.0 µm due to the too low temperature of a cast sheet after a lapse of 1 minute after casting. As a result, a strength was poor.

Comparative Examples 15 and 16 resulted in the too low distribution density of second phase particles having a longest diameter of 0.5 µm or more and less than 2.0 µm due to the too high temperature of a cast sheet after a lapse of 10 minutes after casting. As a result, a strength was poor.

Comparative Examples 17 and 18 resulted in the too low distribution density of second phase particles having a longest diameter of 0.5 µm or more and less than 2.0 µm due to the too low temperature of a cast sheet after a lapse of 10 minutes after casting. As a result, a strength was poor.

Comparative Example 19 resulted in peeling of plating due to the large content of Mn, thereby preventing a strength and a fluttering characteristic from being evaluated.

Comparative Example 20 resulted in peeling of plating due to the large content of Si, thereby preventing a strength and a fluttering characteristic from being evaluated.

Comparative Example 21 resulted in peeling of plating due to the large content of Ni, thereby preventing a strength and a fluttering characteristic from being evaluated.

Comparative Example 22 resulted in peeling of plating due to the large content of Cu, thereby preventing a strength and a fluttering characteristic from being evaluated.

Comparative Example 23 resulted in peeling of plating due to the large content of Mg, thereby preventing a strength and a fluttering characteristic from being evaluated.

Comparative Example 24 resulted in peeling of plating due to the large content of Cr, thereby preventing a strength and a fluttering characteristic from being evaluated.

Comparative Example 25 resulted in peeling of plating due to the large content of Zr, thereby preventing a strength and a fluttering characteristic from being evaluated.

Comparative Example 26 resulted in peeling of plating due to the large content of Zn, thereby preventing a strength and a fluttering characteristic from being evaluated.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

In accordance with the present disclosure, there can be obtained an aluminum alloy substrate for a magnetic disk, having a high strength and an excellent disk fluttering characteristic, a method for producing the same, and a magnetic disk using the aluminum alloy substrate for a magnetic disk.

The invention claimed is:

1. An aluminum alloy substrate for a magnetic disk, the aluminum alloy substrate comprising an aluminum alloy comprising 0.4 to 3.0 mass % of Fe, preferably one or more selected from a group consisting of 0.1 to 0.4 mass % of Si and 0.01 to 1.00 mass % of Zr, and a balance of Al and unavoidable impurities,
wherein second phase particles having a longest diameter of 0.5 μm or more and less than 2.0 μm are dispersed at a distribution density of 5000 particles/mm$^2$ or more.

2. The aluminum alloy substrate for a magnetic disk according to claim 1,
wherein the aluminum alloy further comprises one or more selected from a group consisting of 0.1 to 3.0 mass % of Mn, 0.1 to 3.0 mass % of Ni, 0.005 to 1.000 mass % of Cu, 0.1 to 6.0 mass % of Mg, and 0.01 to 1.00 mass % of Cr.

3. The aluminum alloy substrate for a magnetic disk according to claim 1,
wherein the aluminum alloy further comprises 0.005 to 1.000 mass % of Zn.

4. The aluminum alloy substrate for a magnetic disk according to claim 1,
wherein the aluminum alloy further comprises one or more selected from a group consisting of Ti, B, and V in a total content of 0.005 to 0.500 mass %.

5. The aluminum alloy substrate for a magnetic disk according to claim 1,
wherein a cross section has an average crystal particle diameter of 70 μm or less in a sheet thickness direction.

6. The aluminum alloy substrate for a magnetic disk according to claim 1,
wherein proof stress is 60 MPa or more after heating at 340° C. for 3 hours in atmospheric air.

7. A magnetic disk wherein an electroless Ni—P plating treatment layer and a magnetic layer thereon are disposed on a surface of the aluminum alloy substrate for a magnetic disk according to claim 1.

8. A method for producing the aluminum alloy substrate for a magnetic disk according to claim 1, the method comprising:
a continuous casting step of continuously casting a cast sheet by using the aluminum alloy;
a cold-rolling step of cold-rolling the cast sheet;
a disk blank stamping step of stamping the cold-rolled sheet to have an annular shape;
a pressurization annealing step of subjecting a stamped disk blank to pressurization annealing; and
a cutting and grinding step of subjecting the blank subjected to the pressurization annealing, to cutting work and grinding work, wherein a temperature of the cast sheet after a lapse of one minute after the continuous casting step is set at 230 to 350° C., and a temperature of the cast sheet after a lapse of ten minutes after the continuous casting step is set at 150° C. or more and less than 230° C.

9. A method for producing the aluminum alloy substrate for a magnetic disk according to claim 1, the method comprising:
a continuous casting step of continuously casting a cast sheet by using the aluminum alloy;
a homogenization treatment step of subjecting the cast sheet to homogenization treatment;
a cold-rolling step of cold-rolling the cast sheet subjected to the homogenization treatment;
a disk blank stamping step of stamping the cold-rolled sheet to have an annular shape;
a pressurization annealing step of subjecting the stamped disk blank to pressurization annealing; and
a cutting and grinding step of subjecting the blank subjected to the pressurization annealing, to cutting work and grinding work, wherein a temperature of the cast sheet after a lapse of one minute after the continuous casting step is set at 230 to 350° C., a temperature of the cast sheet after a lapse of ten minutes after the continuous casting step is set at 150° C. or more and less than 230° C., and the cast sheet is heat-treated at 300 to 450° C. for 0.5 to 24 hours in the homogenization treatment step.

10. The method for producing the aluminum alloy substrate for a magnetic disk according to claim 8, the method further comprising an annealing treatment step of annealing the cast sheet or the rolled sheet before or in the cold-rolling step.

11. The aluminum alloy substrate for a magnetic disk according to claim 2,
wherein the aluminum alloy further comprises 0.005 to 1.000 mass % of Zn.

12. The aluminum alloy substrate for a magnetic disk according to claim 2,
wherein the aluminum alloy further comprises one or more selected from a group consisting of Ti, B, and V in a total content of 0.005 to 0.500 mass %.

13. The aluminum alloy substrate for a magnetic disk according to claim 3,
wherein the aluminum alloy further comprises one or more selected from a group consisting of Ti, B, and V in a total content of 0.005 to 0.500 mass %.

14. The aluminum alloy substrate for a magnetic disk according to claim 11,
wherein the aluminum alloy further comprises one or more selected from a group consisting of Ti, B, and V in a total content of 0.005 to 0.500 mass %.

* * * * *